Patented Jan. 22, 1935

1,988,584

UNITED STATES PATENT OFFICE 1,988,584

HOMOGENEOUS COMPOSITION AND PROCESS FOR MAKING THE SAME

Leo I. Dana and Carl W. Georgi, Buffalo, N. Y., assignors to Carbide and Carbon Chemicals Corporation, a corporation of New York No Drawing. Application November 12, 1932, Serial No. 642,456

2 Claims. (Cl. 252—5)

The use of various alcohols as freezing point depressants for liquid media is well known, and the low freezing compositions containing alcohols have been the subject of many modifications and improvements. Alcohols proposed for use in anti-freeze compositions include all of the saturated aliphatic hydroxy compounds, such as the monohydroxy alcohols, methyl, ethyl, isopropyl and propyl alcohols; the alkoxy alcohols, such as betaethoxy ethyl alcohol and betabutoxy ethyl alcohol; and the polyhydroxy alcohols, such as ethylene and diethylene glycol, propylene glycol, alkylene glycols generally of the 1, 2 series, and glycerol. As used in this specification and the appended claims, the term alcohol will be understood to include all of the above compounds.

Among the improvements proposed for alcoholic anti-freeze solutions may be listed the addition of various agents to lessen the tendency of such solutions to become corrosive to iron and other metals. Corrosion inhibitors for this purpose may be those disclosed in applications for patent Serial No. 377,620, filed July 11, 1929, Serial No. 495,302, filed November 11, 1930, and Serial No. 607,507, filed April 25, 1932, by H. L. Cox; those disclosed in Patent No. 1,433,226 issued October 24, 1922 to C. W. Porter; or other corrosion inhibitors known in the art including the aromatic primary, secondary, and tertiary diamines, such as m-toluylene diamine; aldehyde-amine condensation products, such as the product formed by condensing butyraldehyde and aniline in the ratio of 2:1; polyalkylene imines and polyamines; heterocyclic nitrogenous bases, such as pyrrolidine and piperidine; and nitrogenous bases of the aliphatic series other than those disclosed or mentioned above. Other modifying additions may include agents to combat the foam-forming properties of the compositions, as shown by application for patent Serial No. 507,045, filed January 6, 1931, by L. J. Clapsadle; substances to decrease the tendency of compositions to escape from the system in which it is confined, as disclosed by application for patent Serial No. 507,047, filed January 6, 1931, by H. L. Cox; and other additions for various specific purposes.

All of these proposals have resulted in generally improved compositions which have wide application in protecting liquid media from congealing at low temperatures, but certain of the improvements have simultaneously brought about difficulties not present in the unmodified compositions, and not heretofore overcome. For example, it has been found that an improved composition, which with water forms an excellent medium for the transfer of heat or pressure, may be formed by adding an oleaginous material containing free fatty acid together with a corrosion inhibitor and a small quantity of an alkaline earth metal salt which yields substantially neutral aqueous solutions to an alcohol. An example of such composition may comprise about 0.50% to 1.50% by volume of an animal or vegetable oil containing at least about 5% to 10% of free fatty acid, about 0.25% to 0.75% by volume of hydroxyalkylamine or a sufficient quantity to produce a basicity in the final composition represented by a pH value of not less than about 8, and from about 0.01% to 0.1% by weight of the alkaline earth metal salt, with or without an additional quantity of a mineral oil not exceeding the amount of vegetable or animal oil in the composition, and the balance being principally an alcohol. Within the ranges given a preferred composition may be formed of about 1.0% by volume lard oil containing 10% to 15% of free fatty acid, about 0.5% by volume of crude triethanolamine (i. e. containing monoethanolamine and diethanolamine as well as triethanolamine), about 0.2% by volume of mineral oil, and about 0.02% by weight of calcium acetate, the balance of the mixture consisting principally of ethylene glycol. This preferred composition is a particularly useful non-foaming, non-corrosive freezing point depressant for use in automobile radiators, and it has little or no tendency to escape from the radiator through minor crevices. The composition does possess certain disadvantages. For instance the modifying additions separate from the ethylene glycol as an immiscible liquid phase, and when the modified composition is transported or distributed in relatively large containers, such as drums or tank cars, it is practically impossible to withdraw portions of the composition which will have the desired composition without providing for expensive and cumbersome mechanical agitation at the time of each withdrawal. Also, if the composition is provided in small unit containers difficulty may be encountered in pouring out the composition since, under certain conditions, the separated oleaginous layer may congeal and act as a seal or partial seal. Ordinary mixing or agitation provides but a temporary remedy for the difficulty, and consequently must be repeated each time it is desired to have the composition even approximately homogeneous, since the two immiscible phases separate more or less immediately after mixing.

The objects of our invention are to avoid as far as possible the foregoing disadvantages presented by compositions of the class described, and to provide an economical and efficient process for making substantially homogeneous and permanently stable compositions from those compositions described which ordinarily possess a plurality of immiscible liquid phases. Another object is to provide a substantially homogeneous and permanently stable composition useful as a freezing point depressant for liquid media.

We have discovered that the objects of our invention may be attained, and that desirable compositions of the class described may be produced in an entirely novel form which is substantially homogeneous and which, for all practical purposes, remains permanently stable. The process of our invention broadly comprises making a substantially homogeneous permanently stable liquid composition from a plurality of immiscible liquid phases, one of which contains an alcohol and constitutes a predominating proportion of the total, another of which comprises oleaginous material, and at least one of the phases containing a corrosion inhibitor of the organic base type herein described. We make the new homogeneous composition by adding to the immiscible liquid phases in admixture an agent for dispersing the phases with each other, or one within another, and thereafter subjecting the immiscible liquid phases together with the dispersant to a mechanical homogenizing action. The product of our process is a liquid which will not separate or stratify into distinct phases upon standing, and which, for all practical purposes, may be considered, a single homogeneous liquid phase which is permanently stable. It is probably formed of one or more of the original separate phases finely divided and dispersed in another of the phases. The continuous and dispersed phases may be either or any of the original immiscible phases, since which of the immiscible liquid is external and which is internal in the final composition is of no importance for the purpose of our invention.

The dispersing agent may be any known surface tension depressant which does not possess properties which counteract or offset the advantageous properties provided by the other constituents of the composition. Dispersants may be used which also perform another function in the composition. For example oleaginous material containing free fatty acid, such as lard oil, may be saponified or partly saponified with an organic base, such as a hydroxyalkylamine or other amine, and this combination will serve both as a corrosion inhibitor and dispersing agent. Other dispersing agents may be glycerol, poly glycerol, glycol or poly glycol fatty acid esters, sulfonated fatty acids, naphthalenes or oils which are substantially neutral; sodium, potassium or ammonium soaps; soaps made from organic amino bases, and fatty acids; gum tragacanth, gum Arabic, and the like. We have also found that small amounts of polyethylene glycol monoalkyl ethers, such as diethylene glycol monobutyl ether, assist in stabilizing the homogenized composition.

The treatment of our invention may be accomplished by any suitable mechanical homogenizing means. For example, one of the various known types of colloid mills may be employed of the disc attrition, concentric ring or cone, beater or jet-and-cone type. Other equivalent mechanical means for producing violent agitation of the immiscible liquids which is capable of effecting fine subdivision of the liquids in intimate contact with each other may be used.

The invention will be illustrated by the following specific example:

A composition containing 1.1% by volume of lard oil (containing about 10% to 15% of free fatty acid), 0.18% by volume of straight distilled, naphthenic base mineral oil having a viscosity of about 200 seconds Saybolt at 100° F., and a pour test of below 0° F., 0.55% by volume of crude triethanolamine (about 75% to 80% triethanolamine, about 15% to 20% diethanolamine, and about 5% monoethanolamine) and about 0.02% by weight of calcium acetate, the balance being principally ethylene glycol, was prepared. This composition as made exhibited two liquid phases which were immiscible. The composition was then passed through a colloid mill comprising fluted concentric rings having a clearance between them of 0.003 to 0.004 inches, and one of which was being driven so that a speed of approximately 9,000 feet per minute was maintained at the periphery of the rings. The composition after being treated as described apparently contained the oleaginous material and hydroxyalkylamine permanently dispersed in a physical state of fine subdivision in the ethylene glycol, and remained stable after standing for nine weeks, and at the end of this period showed no tendency to separate into layers. By way of comparison, the same composition, after thorough mechanical agitation of the components separated almost completely into two layers after standing 1 to 2 hours.

If the process of our invention is conducted by treating the immiscible liquids in a colloid mill, we prefer to provide clearances between the attriting or beating elements which are of the order of about 0.002 to about 0.10 inches, and to provide agitation which is equivalent to peripheral speeds of about 7,000 to about 15,000 feet per minute in those devices having circular motion.

In general, the composition may be composed of an alcohol-containing phase constituting at least 95% of the total and may contain up to about 3.0 or 4.0% by volume of oleaginous material containing at least 5% of free fatty acid. The oleaginous material may be an organic oil, such as an animal or vegetable oil, or a mixture of an organic oil with a mineral oil. Examples of suitable materials are lard oil, sperm oil, soya bean oil, cotton seed oil and corn oil. Commercially pure fatty acids may be substituted for the above fatty oils. For example, stearic, oleic or linoleic acids may be used. Naphthenic base mineral oils are preferred, and we prefer to use mineral oils of relatively low pour point. The mineral oil may be omitted entirely, and in any case the oleaginous material, whatever its nature, should contain at least 5% of free fatty acids.

The corrosion inhibitor should be added in sufficient quantity to produce an alkalinity in the final composition not less than that represented by a pH value of about 8. At the same time the alkalinity of the composition should not be allowed to increase beyond that represented by a pH value of about 11, since between the limits of about 8 and about 11, the compositions are substantially non-corrosive to brass, copper, solder and aluminum, as well as to iron, and related metals. In the event that the organic base used as the corrosion inhibitor produces an alkalinity in the final composition greater than that represented by a pH value of about 11, the composition may be buffered by producing a salt of the corrosion inhibitor in the composition, for example, the organic base may be partially neutralized by an acid such as phosphoric, tartaric, acetic, oleic or other relatively weak inorganic or organic acid, thus enabling the production and maintenance of a pH value in the final composition within the preferred limits.

We prefer to include an alkaline earth metal salt for the purpose of reducing the tendency of aqueous solutions of the compositions to foam excessively. The proportion of the alkaline earth metal salt in the composition may be between about 0.01 and about 0.1% by weight, about 0.02% by weight of calcium acetate being preferred. Those salts of alkaline earth metals which are water soluble and which produce substantially neutral aqueous solutions are preferred in order that undue acidity or alkalinity will not be produced by hydrolysis of the salt used.

If hydroxyalkylamines are employed as the corrosion inhibitors, the proportion of oleaginous material containing free fatty acid to the hydroxyalkylamine should be from about 1:1 to about 2:5:1 by volume. Hydroxyalkylamines, such as the ethanolamines and the isopropanol or propanolamines, are well suited for use in the new compositions.

We claim:—

1. A substantially homogeneous permanently stable liquid composition comprising ethylene glycol constituting at least about 95% of the total, an oleaginous material containing lard oil which contains about 10% to 15% of free fatty acid together with ethanolamines, the ratio of the quantity of said lard oil to the quantity of said ethanolamines being from about 1:1 to about 2:5:1.

2. A substantially homogeneous permanently stable liquid composition comprising ethylene glycol, about 1.0% by volume of lard oil containing about 10% to 15% of free fatty acid, about 0.2% by volume of mineral oil, about 0.5% by volume of a mixture of ethanolamines and about 0.02% by weight of calcium acetate, the quantity of ethylene glycol constituting substantially the balance of the composition.

LEO I. DANA.
CARL W. GEORGI.